United States Patent [19]

Gerber

[11] Patent Number: 4,916,713
[45] Date of Patent: Apr. 10, 1990

[54] LASER OR LIGHT TARGET DESIGNATOR DEVICE

[76] Inventor: Peter Gerber, Im Unterzelg 68, 8965 Berikon, Switzerland

[21] Appl. No.: 199,119

[22] Filed: May 26, 1988

[30] Foreign Application Priority Data

Jan. 26, 1988 [CH] Switzerland ............................ 258/88

[51] Int. Cl.⁴ .............................................. H01S 3/00
[52] U.S. Cl. ...................... 372/109; 372/107; 372/65
[58] Field of Search ............... 372/106, 109, 65, 75, 372/107

[56] References Cited

U.S. PATENT DOCUMENTS

| | | | |
|---|---|---|---|
| 3,617,926 | 11/1971 | Bullinger | 372/65 |
| 3,916,336 | 10/1975 | Kaiser | 372/65 |
| 4,201,951 | 5/1980 | Mohler | 372/65 |
| 4,203,080 | 5/1980 | Wright et al. | 372/65 |
| 4,447,136 | 5/1984 | Kitamura | 372/108 |
| 4,734,912 | 3/1988 | Scerbak et al. | 372/75 |
| 4,734,916 | 3/1988 | Hoag | 372/65 |
| 4,764,983 | 8/1988 | Walter | 372/65 |

*Primary Examiner*—Leon Scott, Jr.
*Attorney, Agent, or Firm*—Ostrolenk, Faber, Gerb & Soffen

[57] ABSTRACT

A light source aiming device comprising a case for a light source having an optical axis. An adjusting device adjustably positions the light source within the case along x and y axes both perpendicular to said optical axis. The adjusting device includes a bracket for supporting the light source and two adjustment elements each of which provides an adjustment along a respective one of the x and y axes. Each of the adjustment elements is received in a groove in the bracket along the respective axis so that it holds the element stationary along the respective axis while it is slidable in the groove along the direction of the other axis.

11 Claims, 3 Drawing Sheets

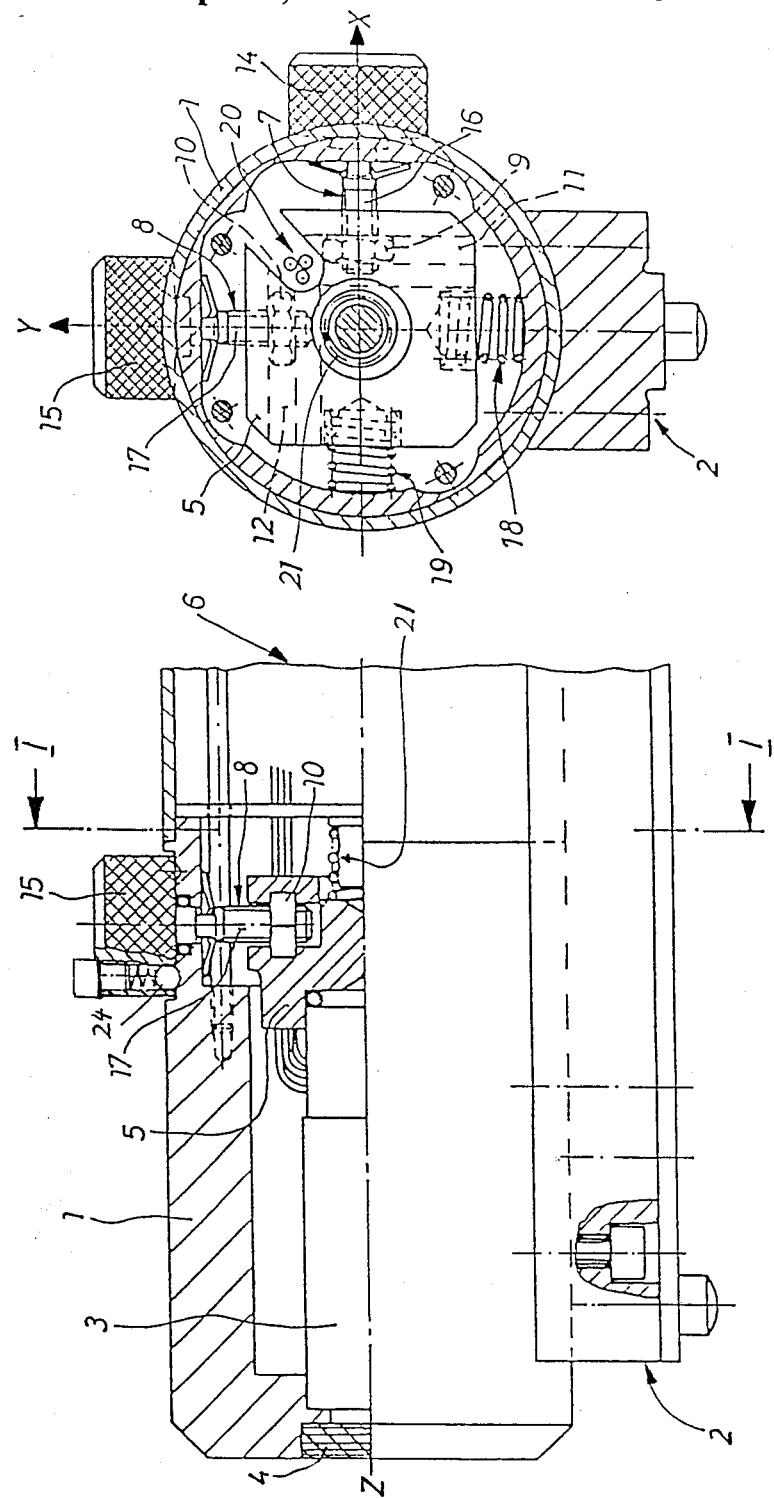

LASER OR LIGHT TARGET DESIGNATOR DEVICE

BACKGROUND OF THE INVENTION

1. Field of the Invention

The present invention relates to a laser or to a device for designating a target by means of a laser of equivalent light source (a so-called) light target designator device). Devices of this kind are mounted to optical instruments or weapons for designating a target by means of a visible or invisible laser or light spot. In order to adjust the optical axis of the laser or light source with the axis of the instrument used therewith, it is necessary to tilt the optical axis in an x- and a y-direction in the system of coordinates. The x-direction normally is in a horizontal plane, whereas the y-direction is in a vertical plane.

2. Description of the Prior Art

Known adjusting devices for this purpose for each of said x- and y-directions have a one-sided adjusting element cooperating with a bracket for the light source, which adjusting element works against a spring. This results in two substantial drawbacks. First, there is the danger that due to shock and/or vibrations the bracket is temporarily moved off its position against the force of said spring and thereafter does not exactly return to its initial position again. This results in a misalignment of the light beam after the occurrence of a shock, which then necessitates a readjustment of the device. Secondly, with adjusting devices of the type mentioned it is nearly impossible to arrive at reproducible beam positions by repeated identical adjusting procedures.

Therefore, there is always a slight deviation from the correct beam position depending on the actual direction of adjustment, i.e. on whether the adjustment has been made by displacing the bracket towards the positive or the negative side of the x- or y-direction.

SUMMARY OF THE INVENTION

Hence, it is an object of the invention to provide a laser or light target designator device which obviates the above outlined drawbacks and provides a shock-resistant, reproducible adjustment of the laser or light beam in this device.

A further object of the invention is to provide a laser or light target designator device comprising a case for a laser diode or light source having an optical axis and an adjusting device for adjustably positioning said laser diode or light source within said case in an x- and y-direction perpendicular to said optical axis, said adjusting device comprising a bracket for supporting said laser diode or light source and two adjustment elements each controlling adjustment along a respective one of said x-and y-axes, wherein each of said adjustment elements engages said bracket along its respective axis in a form-locking way and is slidably held therein along the direction of the other axis.

BRIEF DESCRIPTION OF THE DRAWINGS

The invention will be better understood and objects and advantages other than those set forth above will become apparent when consideration is given to the following detailed description thereof. Such description makes reference to the annexed drawings, wherein:

FIG. 1 is a cross-sectional view of a first embodiment of the invention along the optical axis thereof;

FIG. 2 is a cross-sectional view along line I—I in FIG. 1;

DESCRIPTION OF THE PREFERRED EMBODIMENTS

Figures 3, 4:
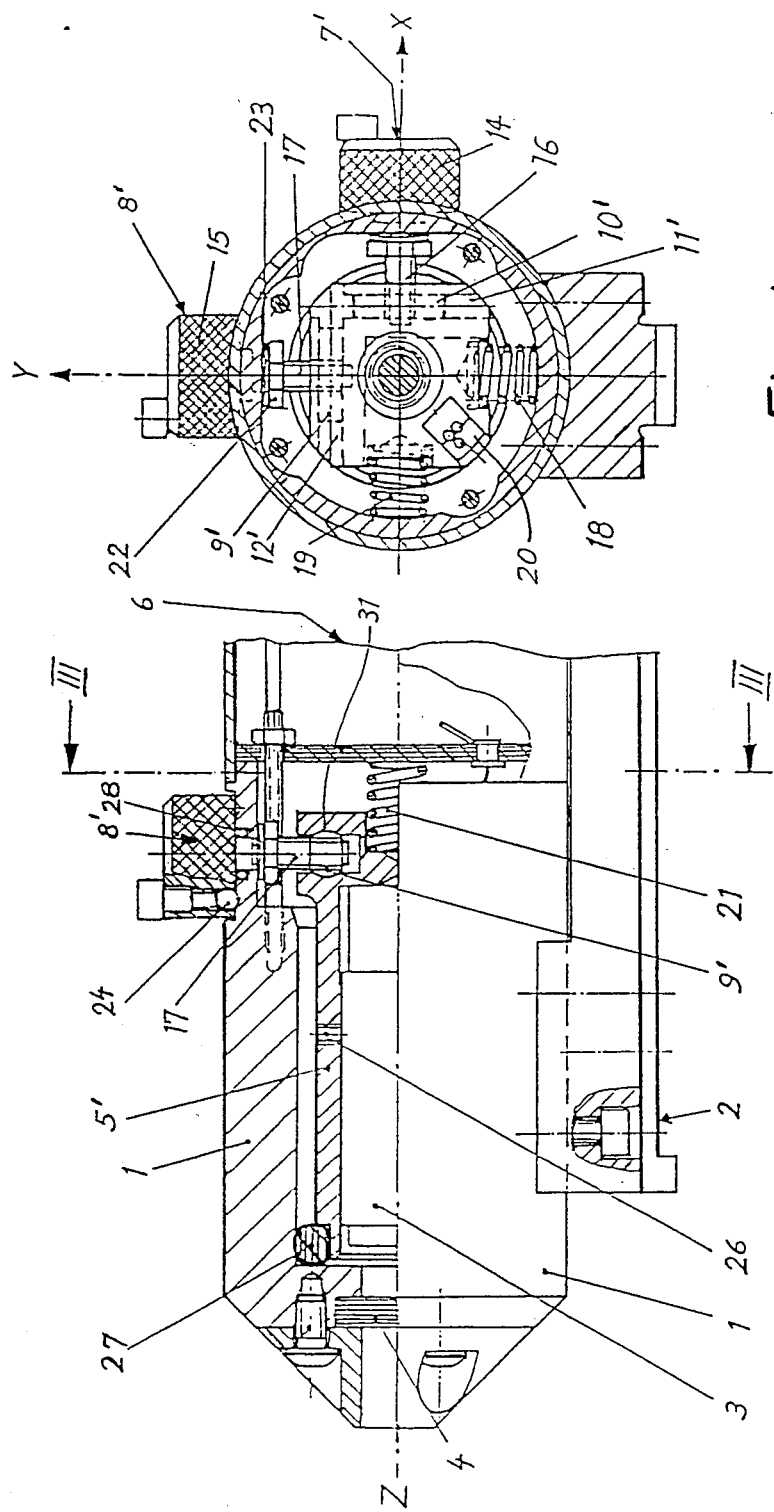
FIG. 3 is a cross-sectional view along the optical axis of a second embodiment of the invention.
FIG. 4 is a cross-sectional view along line III—III of FIG. 3.

Three different embodiments of the invention will be described in more detail. Identical parts will only be described in connection with the first embodiment, which is exhibited in FIGS. 1 and 2, which show the general construction and idea of a precise x-y adjustment for visible and invisible laser or light target designators.

A case 1 is mounted on a mechanical adapter 2. This adapter is used to mount the system on different weapons or instruments.

In the case 1 a laser diode or other light source 3 is mounted. The light from the source passes through a blocking filter 4 at the front of the case 1. The laser diode or light source 3 is mounted in a bracket 5 and this bracket is tiltable along the x-y axes at a right angle to the optical axis z. To this end the laser diode or other light source 3 can be adjusted together with the bracket 5 at its rear side along all axes, whereas its front part substantially stays in place. Not shown in FIG. 1 is the back part 6 of the case 1. This back part 6 contains the electronics and the battery for the laser or light source.

The adjustment of the system using the bracket 5 is done by means of two adjustment elements 7, 8 in a x-y system of coordinates. The adjustment elements 7, 8 comprise turning knobs 14, 15 on the outside of the case 1 and adjusting screws 16, 17 which extend into the bracket 5 and therein engage a respective coupling member, which in this case is a nut 9, 10. Each of these nuts is slidably held within its respective groove 11, 12 in the bracket body.

Due to this configuration each adjustment element is permanently and rigidly connected to the mounting bracket 5. The nuts 9, 10 and the grooves 11, 12 of the case 1 together constitute a locking connection for the adjustment elements. If an adjustment is done in the x-direction, nut 9 pushes bracket 5 along this direction, whereas nut 10 provides an exact guidance for the bracket when it is moving along the adjustment direction. Therefore, the x-and y-adjustment are always independent of each other. A turning of the respective knob in the plus x direction and back again in the minus x direction can be done without any loss of angle, since the nuts 9, 10 also function as return means in the grooves 11, 12. The turning knobs 14, 15 are continuously turnable or are positioned by means of a small ball point 24 and a pressure spring for defining fixed positions. Each small movement of the bracket 5 by means of the turning knobs then is an exact percentage of the angle of the laser beam movement in the respective x-and/or y-direction and every adjusting position is exactly reproducible.

The laser diode or other light source is fixed within the bracket 5 without any play. The nuts 9, 10 are biased by means of strong springs 18, 19, whereby any play in the whole device is eliminated.

An additional spring 21 from the back part of the case 1 presses the bracket 5 permanently towards the front end of the case. Therefore no movement of the bracket 5 is possible in the z direction. Thereby, a permanently good seat is provided for the mounting bracket 5 within the case 1. The described device effectively provides a play free x-y adjustment without a displacement in the z direction.

In order to provide an electrical connection of the light source or laser to the battery in the back part 6 of the case 1, conducting wires are guided through a slit 20 in the bracket 5.

In the embodiment of FIGS. 1 and 2, only the rear part of the laser diode 3 is contained within the bracket 5, whereas its front part is tiltably supported directly on case 1.

In another embodiment of the invention as shown in FIGS. 3 to 6, the diode 3 is fully enclosed within the bracket 5', which itself is tiltably supported on case 1.

An embodiment of this type is shown in FIGS. 3 and 4. The main difference, however, relative to the aforementioned device is that instead of mere nuts for engaging the grooves in the bracket, tiltable coupling members 9', 10' are provided. Whereas in the aforementioned device the adjusting screws 16, 17 themselves are tilted for larger deflections of the adjusting device from a neutral position, the adjustment elements 7', 8' of the presently described embodiment substantially move along defined and stationary x-y-axis. Any adjustment then is done precisely along one of the x-and/or y-axis of the system of coordinates, which results in a more precise adjusting procedure. The coupling members 9', 10' to this end are rod-like members with rounded-off flanks. They therefore are turnable around their axis within their respective guiding grooves 11', 12', which have correspondingly rounded-off walls 31. If the bracket 5' is tilted with respect to the z-axis, the adjustment members 7', 8' remain in their x- and y-axis-directions. This also facilitates the sealing of the opening in the case 1 for the adjustment members 7', 8'. Furthermore the described coupling members 9', 10' provide for a more precise x-y-movement, especially for large deviations from the neutral position at which the exact x-y-position is still maintained. The bore-like guiding grooves 11', 12' can be manufactured much more easily and precisely than rectangular grooves. Due to this and to the length of the rodlike coupling members 9', 10', the adjusting precision is improved.

At its front end the bracket 5' and the light source are centered to the neutral optical axis of the device by means of an O-ring 27 arranged within the front end of the case 1. In the aforementioned embodiments of FIGS. 1 to 4 the bracket 5, 5' is biased by means of a spring 21 against this front end of the case 1 to fix its position in the z-direction.

Figure 6:
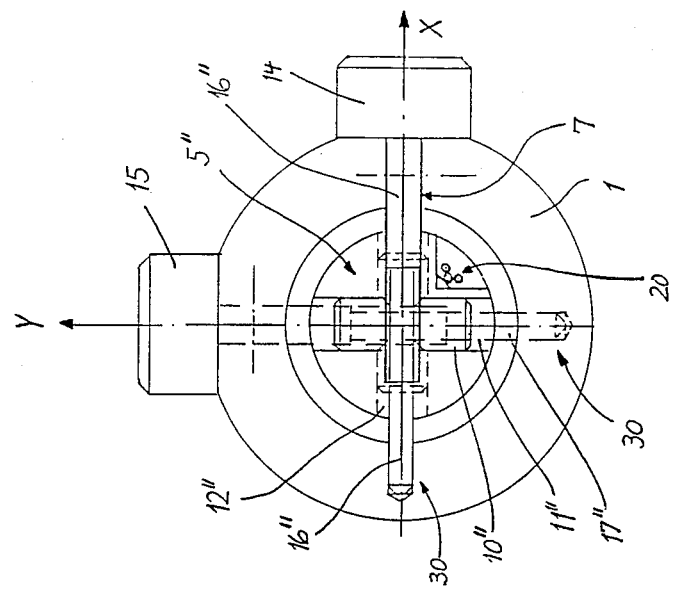
FIG. 6 is a cross-sectional view along line V—V in FIG. 5.
Figure 5:
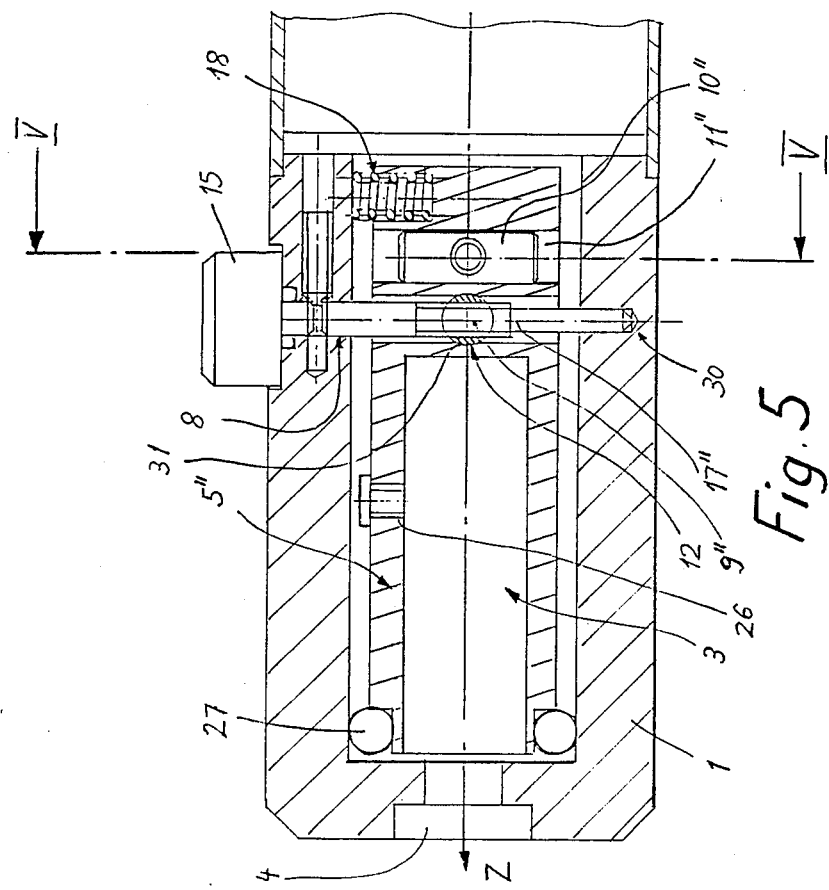
FIG. 5 is a cross-sectional view of a third embodiment along the optical axis thereof.

In still another embodiment of this invention, which is exhibited in FIGS. 5 and 6, the bracket 5" is mounted rigidly to the case 1 in the Z-direction. Therefore, no biasing spring 21 is necessary therein. To this end the adjusting screws 16", 17" extend across the bracket 5" to the other side of the case 1 and are rotatably supported in a bore 30 in the wall of the case 1 without play. By means of these screws 16", 17", the position of the bracket 5" in the z-direction is defined. Moreover, the bracket 5" no longer needs to be biased against the front end of the case 1, so that it is centered more accurately. Thereby the total accuracy of the adjusting device can be improved.

In this embodiment two adjusting screws 16", 17" no longer are in one and the same plane but are displaced to from each other in the z-direction. Therefore, the adjustments for the x- and the y-axis are no longer identical in their respective angles. This, however, is compensated by the threads of the adjusting screws 16", 17", which are slightly different, or by differently arranging the positioning holes for the two knobs 14, 15.

The advantage of this embodiment lies in the fact that the mounting bracket 5" is rigidly positioned in all three directions x, y and z. Every adjusting position is fully reproducible and shocks to the device from every direction do not affect the adjusting position.

The coupling members 9", 10" are substantially the same as in the embodiment of FIGS. 3 and 4, i.e. they are tiltable around the axis of their guiding grooves 11", 12" and slidable therein along said axis. In contrast to the other embodiments the guiding grooves 11", 12" are bores extending through the center of the bracket 5".

All of the described embodiments of the invention are resistant to shocks and vibrations, which thus do not influence the adjusted x-y-position of the light source, so that the light source or laser diode does not get misaligned during use.

Furthermore, in all of the embodiments of the invention exact reproducibility of any adjusted position is guaranteed, since the bracket 5, 5', 5" is rigidly connected to the adjustment members 7, 8 in the respective direction. No readjustment is necessary after strong shocks or vibrations so that it is unnecessary to realign the devices periodically, as in known systems. Moreover, any prior adjusting position can easily be reproduced without realignment procedures.

While there is shown and described present preferred embodiments of the invention, it is to be distinctly understood that the invention is not limited thereto, but may be otherwise varied and modified within the scope of the following claims.

I claim:

1. A light source aiming device comprising, a light source having an optical axis; a case for said light source and adjusting means for adjustably positioning said light source within said case along an x axis in one direction and along a y axis in another direction, the x and y axes intersecting each other and also being perpendicular to said optical axis, said adjusting means comprising a bracket within said case for supporting said light source and first and second adjustment elements for adjustably positioning said bracket along said x and y axes, respectively, wherein each of said adjustment elements engages said bracket along its respective one of said x and y axes in a locking relationship for moving said bracket in a direction along its respective axis, and each of said adjustment elements is slidably held in said bracket for movement along the direction of the other one of said x and y axes.

2. A light source aiming device comprising, a light source having an optical axis; a case for said light source and adjusting means for adjustably positioning said light source within said case along an x axis in one direction and along a y axis in another direction, the x and y axes intersecting each other and also being perpendicular to said optical axis, said adjusting means comprising a bracket within said case for supporting said light source and first and second adjustment elements for adjustably positioning said bracket along said x and y axes, respectively, wherein each of said adjustment elements engages said bracket along its respective one of said x and y axes in a locking relationship for moving said bracket in a direction along its respective axis, and each of said adjustment elements is slidably held in said bracket for movement along the direction of the other one of said x and y axes, and wherein each adjustment element comprises an adjusting screw extending in the respective direction of its said axis, said screw having a thread, and a coupling member engaged by said thread of said adjusting screw, said bracket comprising a respective groove for guiding each of said coupling members, wherein said guiding groove for the said coupling member that extends in the direction of said x axis that said guiding groove extends in the direction of the y axis while said guiding groove for the said coupling member that extends in the direction of said y axis that said guiding groove extends in the direction of the x axis.

3. A light source aiming device as claimed in claim 2, wherein each of said coupling members comprises a nut and said grooves within said bracket have cross sections which slidably receive a respective one of said nuts for blocking said nut from moving along the respective said axis of said nut while permitting said nut to slide along the other of said x and y axes; said nuts having external shapes for cooperating with said cross-sections of the respective said grooves for blocking each said nut against rotation within its respective said groove.

4. A light source aiming device as claimed in claim 3, further comprising a spring for biasing said bracket against said case in a direction along said optical axis for defining the position of said bracket in the direction of said optical axis.

5. A light source aiming device as claimed in claim 2, wherein each of said coupling members comprises an elongated rodlike element held within a respective one of said grooves in said bracket, said rodlike elements and their respective said grooves have cooperating, contacting rounded-off walls extending along the lengths of the respective said grooves such that each said coupling member together with its said adjusting screw is turnable around said cooperating, contacting walls and is also slidable along its axis of elongation within its said guiding groove in said bracket.

6. A light source aiming device as claimed in claim 5, further comprising a spring for biasing said bracket against said case in a direction along said optical axis for defining the position of said bracket in the direction of said optical axis.

7. A light source aiming device as claimed in claim 1, wherein said case has and is defined by opposite walls, and each said adjustment element comprises an adjusting screw with a thread and a coupling member engaged by said thread of said adjusting screw, each said adjusting screw extending across said bracket and being rotatably supported at said opposite walls of said case for rigidly supporting said bracket in the direction of said optical axis.

8. A light source aiming device as claimed in claim 7, wherein said bracket has defined in it a respective guiding bore for each of said coupling members, said guiding bores extend across said bracket along said x and y axis, respectively.

9. A light source aiming device as claimed in claim 8, wherein each of said coupling members comprises an elongated rodlike element held within a respective one of said bores in said bracket, said rodlike elements and said bores having cooperating, contacting rounded-off walls extending along the respective said grooves such that each said coupling member together with its said adjusting screw is turnable around said cooperating, contacting walls and is also slidable along its axis of elongation within its said guiding bore.

10. A light source aiming device as claimed in claim 1, further comprising means for tiltably supporting one end of said light source and said tiltable supporting means being in the vicinity of a front end of said case, and the other end of said light source is adjustably displaceable along said x axis and along said y axis by said adjusting means so that said light source can be placed in a tilted position relative to said optical axis.

11. A laser device as claimed in claim 10, wherein said adjusting means is located near said other end of said light source.

* * * * *